UNITED STATES PATENT OFFICE.

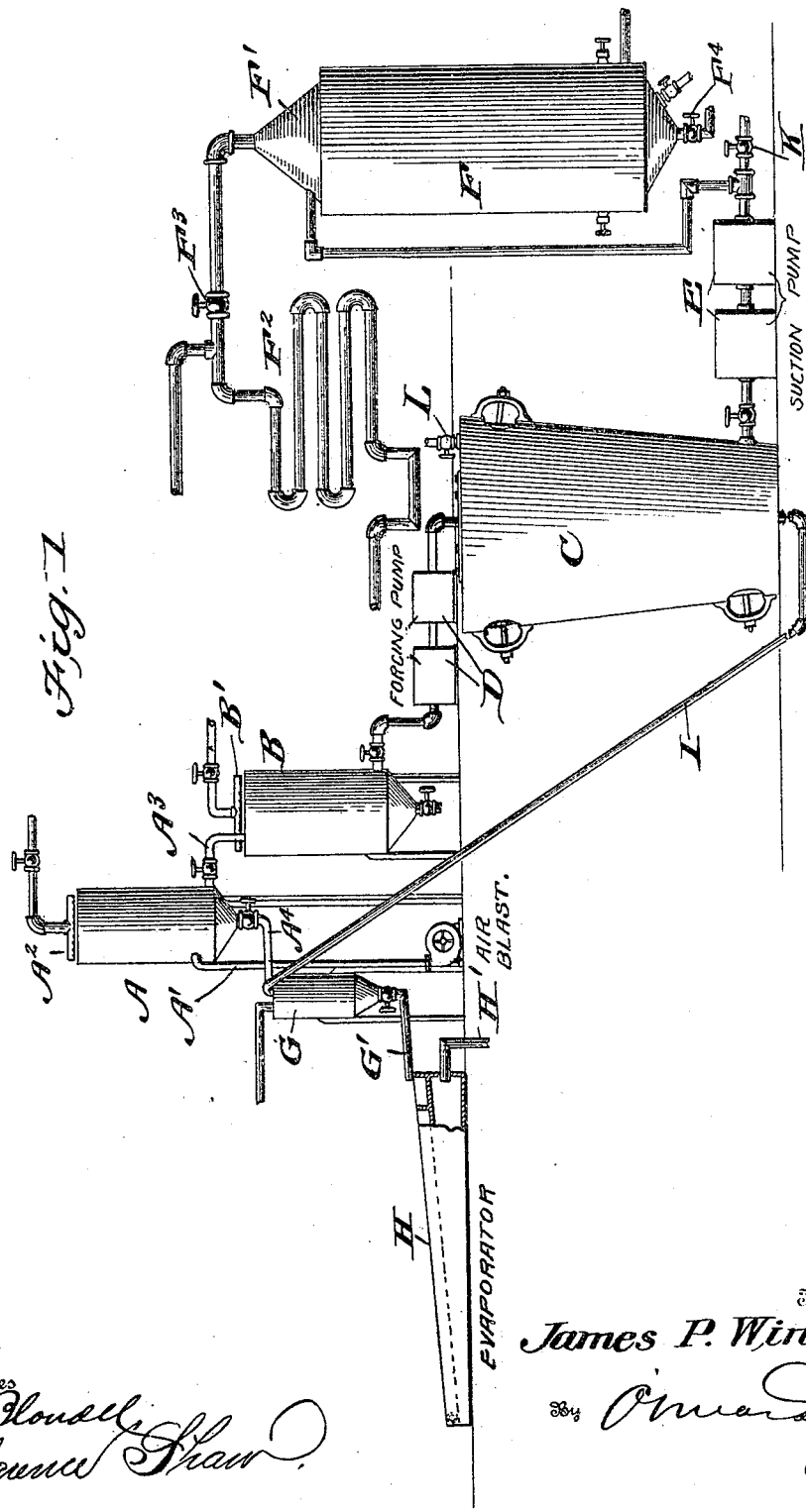

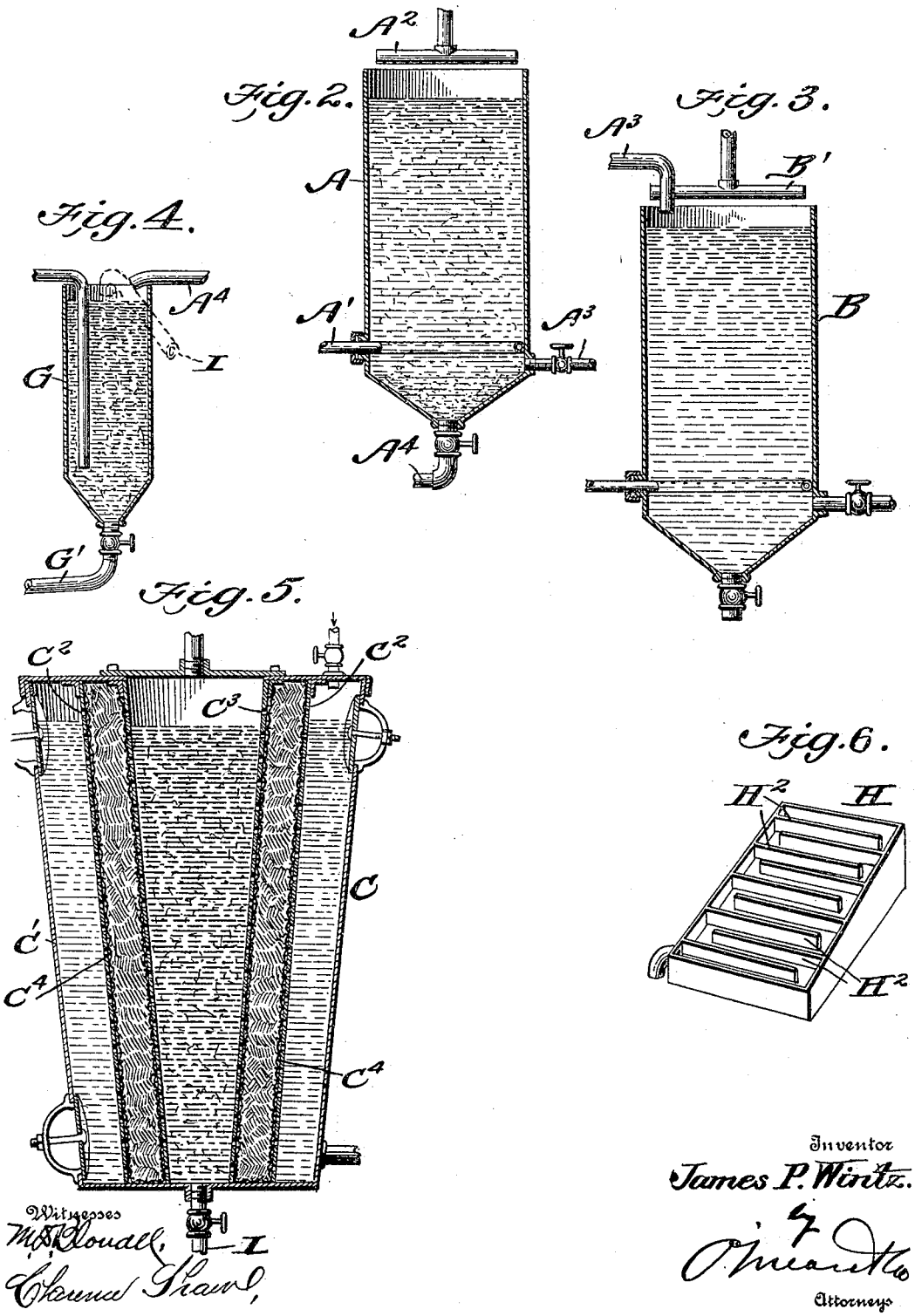

JAMES PHILIP WINTZ, OF SOURLAKE, TEXAS.

PROCESS FOR TREATING PETROLEUM-OILS.

No. 807,983.     Specification of Letters Patent.     Patented Dec. 19, 1905.

Application filed June 15, 1901. Serial No. 64,702.

*To all whom it may concern:*

Be it known that I, JAMES PHILIP WINTZ, a citizen of the United States, residing at Sourlake, in the county of Hardin and State of Texas, have invented a new and useful Process for Obtaining Asphaltum from Petroleum-Oils, of which the following is a specification.

This invention is an improved process for treating petroleum-oils, the object of the invention being to separate the asphaltum from the oil in order to produce a mercantile commodity.

With these objects in view the invention consists, mainly, in the separation of asphaltum from the oil by use of light hydrocarbon and an acid.

The invention consists also in cleaning and purifying the asphaltum by washing it in an alkaline solution.

The invention consists also in certain details hereinafter fully described, and pointed out in the claim.

In the drawings forming a part of this specification, Figure 1 is a side elevation of an apparatus adapted to carry out my process. Fig. 2 is a vertical section through a tank into which the crude petroleum-oil is first placed. Fig. 3 is a vertical section through a tank into which the oil passes from the tank shown in Fig. 2. Fig. 4 is a vertical section through the tank into which the asphaltum passes from the bottom of the tank shown in Fig. 2. Fig. 5 is a sectional view of a filter through which the oil is passed after leaving the tank shown in Fig. 3. Fig. 6 is a perspective view of an evaporator.

This apparatus has been found satisfactory in carrying out my process, and the apparatus will be described in order that the various steps of the process may be fully understood.

The tank A may be of any size and shape, and into this tank is introduced a crude petroleum-oil containing about eighteen per cent. of asphaltum. In this tank the first treatment takes place and consists in mixing with the crude petroleum one and one-fourth gallons of sulfuric acid and four and one-half gallons of gasolene to each barrel of the crude petroleum-oil and subjecting the entire mass to an agitation, preferably by means of an air-blast, the air being forced into the lower portion of the tank A through a suitable pipe $A'$. As shown in Fig. 2, the pipe $A'$ extends transversely across the lower portion of the tank and is perforated within the tank, thereby forcing a plurality of air-jets into the mixture. After agitation the mass is permitted to settle for ten hours, during which time the asphaltum settles to the bottom of the tank A. A water-supply pipe $A^2$ opens into the upper portion of the tank A, and after the settling of the asphaltum, as above mentioned, a further separation is produced by admitting water through the said pipe $A^2$, the amount of water admitted being in the proportion of ten gallons of water to one barrel of the crude petroleum-oil. After this final separation of the asphaltum from the oil the oil itself is drawn off through a pipe $A^3$ and passes into a tank B, where the second step in the treatment of the oil takes place. This second step consists in treating the oil with a solution of one gallon of caustic soda having approximately a specific gravity of 1030 to the barrel, and the entire mass is agitated in any desired manner, preferably by an air-blast, and after this agitation the mass is permitted to settle for one hour and is then again agitated for one-half of an hour, and during the second agitation water is supplied through a perforated pipe $B'$ for the purpose of washing the oil. The first agitation neutralizes or kills any acid which may have been carried over from the tank A to the tank B. The oil is then passed from the tank B to a filter C, a suitable pump or other forcing apparatus D being arranged between the tank B and the filter C. After filtering the oil is drawn from the filter by means of vacuum or suction pump E and conveyed into a still F. A still is provided with a suitable discharge-valve $F^4$ with a dome $F'$ and a discharge-coil $F^2$, controlled by a valve $F^3$, and by-products of the oil are passed outwardly through the dome $F'$ and pipe $F^2$. The asphaltum which has settled into the lower portion of the tank A is drawn off from said tank through a pipe $A^4$ into a receptacle G, where it is washed with water and caustic soda, after being made limpid by mixing with the asphaltum one quart of gasolene to each twenty pounds of asphaltum, and after being so washed the asphaltum is carried to an evaporator H through a pipe $G'$. This evaporator may be of any preferred construction; but in practice I have found that a shallow pan divided by means of a series of alternating partitions $H^2$ to answer the purpose well, the partitions being so arranged as to provide the circuitous course through which the asphaltum must pass to the lower end of the evaporator. In its passage through the evaporator all water and volatile products are thrown off. A pipe I also extends from the bottom of the filter C to the top of the receptacle G, and any asphaltum which may collect in the bottom of the filter is forced through the pipe I by any convenient means to the tank G, where it is treated in the same manner as the asphaltum brought direct from the tank A. Where it is not desired to pass the oil from the filter C to the still F, it may be discharged from the valve K.

Having thus fully described my invention, what I claim as new, and desire to secure by Letters Patent, is—

A step in the process herein described which consists in separating asphaltum from crude petroleum-oil by means of gasolene and sulfuric acid, treating the separated asphaltum with gasolene, water and caustic soda and then passing the asphaltum so treated through an evaporator, substantially as described.

JAMES PHILIP WINTZ.

Witnesses:
 CLAY S. BRIGGS,
 A. E. BUSH.